Aug. 13, 1957     J. A. TALTAVALL, JR     2,802,679
MECHANICAL SEAL FOR PUMPS
Filed June 30, 1953
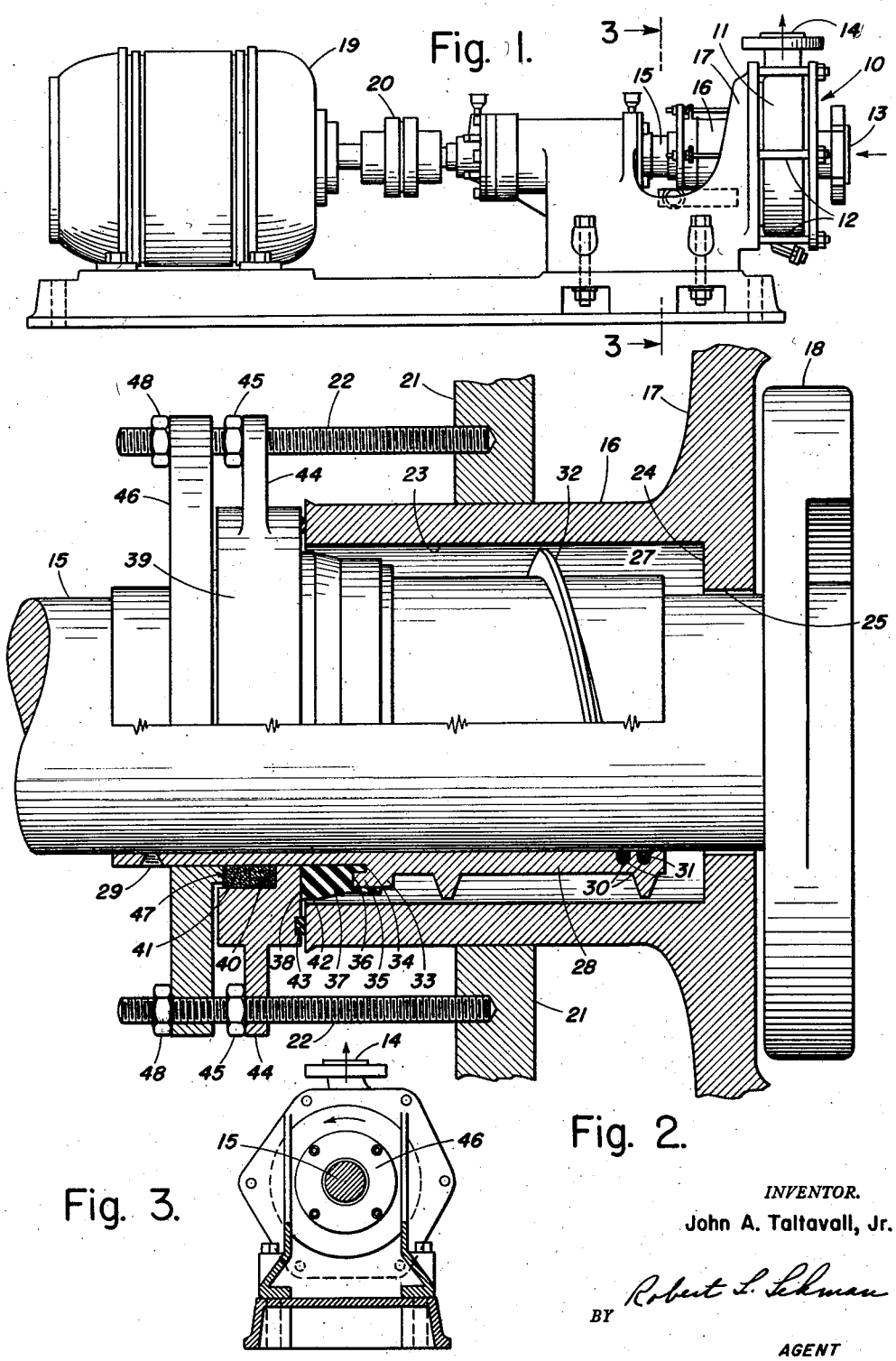
INVENTOR.
John A. Taltavall, Jr.
BY Robert L. Lehman
AGENT

United States Patent Office 2,802,679
Patented Aug. 13, 1957

2,802,679

MECHANICAL SEAL FOR PUMPS

John A. Taltavall, Jr., Morgan, N. J., assignor to National Lead Company, New York, N. Y., a corporation of New Jersey Application June 30, 1953, Serial No. 365,131

4 Claims. (Cl. 286—11.13)

The present invention relates in general to shaft seals and more especially to a mechanical seal for sealing the shafts of liquid pumps of the type used for pumping heavy and corrosive liquids and those containing suspended solids.

The many types of mechanical seals for rotating shafts and especially the shafts of centrifugal pumps may be divided into two general classes, namely inside seals and outside seals. A modification of these two basic types of mechanical seals is the so-called balanced seal. Although these mechanical seals are widely used, each has limitations which restrict its application. Thus, whereas the inside seal is ideal for high pressure applications, this type of seal is not adjustable exteriorally of the seal, and hence adjustments can be made only by disassembling the pump. Moreover, mechanical seals of the inside seal type embody many relatively small parts such as springs, set screws and the like which are particularly subject to attack by corrosive liquids.

The outside seal has the advantage of outside adjustments but is essentially a low pressure seal; while the so-called balanced seal is limited by the construction of its passageways to use with substantially clear liquids.

It is desirable, therefore, to provide a mechanical seal which will maintain a liquid tight seal over a wide pressure range, which may be adjusted readily, preferably exteriorally of the seal, and which will operate satisfactorily with all types of liquids.

An object, therefore, of the present invention is to provide an improved mechanical seal for rotary shafts.

A further object of the invention is to provide the shaft of a liquid pump with a mechanical seal which is of simple and inexpensive construction and which may be used successfully in pumping acids, slurries, or salt water as well as liquids containing suspended solids.

A still further object of the invention is to provide a pump shaft with an enclosed mechanical seal capable of being adjusted externally of the seal housing without dismantling the seal.

A still further object of the invention is to provide a pump shaft with an externally adjustable inside seal operable over a wide pressure range and capable of developing hydrostatic pressure within the seal housing to minimize the influx of liquid therein.

These and other objects, features and advantages of the invention will be described hereinafter in more detail with reference to the accompanying drawings which show, for illustrative purposes, one mode of carrying out the present invention and in which:

Figure 1 is a side elevation in reduced scale of a liquid pump embodying the present invention, the pump being shown connected to an electric motor.

Figure 2 is an enlarged fragmentary sectional view of the mechanical seal embodied in the liquid pump of Figure 1; and Figure 3 is a transverse sectional view of the pump and motor assembly on section line 3—3 of Figure 1.

Referring to the drawings, the liquid pump 10 is of the vertical split type having a casing 11, the two halves of which are secured together by bolts 12. The pump has a low pressure inlet line 13 and a high pressure outlet line 14. The rotating shaft of the pump is indicated at 15 and is shown extended through the mechanical seal housing 16, sometimes referred to as a stuffing box, which is coextensive with the pump volute 17 which forms the chamber for the pump impeller 18. Other details of the pump per se are preferably omitted as being not pertinent to the present invention since the mechanical seal of the present invention will operate satisfactorily to seal the shaft joint of most any type of centrifugal pump, the vertical split type pump shown being merely illustrative and not restrictive of the invention.

The pump impeller 18 is adapted to be driven by an electric motor 19 through a flexible connection 20 by which the impeller shaft 15 is connected to the electric motor 19.

Referring especially to Figure 2, the housing 16 of the mechanical seal constitutes a substantially cup-shaped hub which is integral with and projects from the volute 17 of the pump casing. In the type of pump shown herein, a frame member 21, which may be integral with the pump volute 17, extends in juxtaposition to the housing 16 on diametrically opposite sides thereof respectively, and is provided with internally threaded apertures which are substantially parallel to the longitudinal axis of the housing 16 and adapted to accommodate stud bolts 22 as and for the purpose hereinafter described.

The interior of the cup-shaped housing 16 comprises substantially straight cylindrical side walls 23 and a centrally apertured inboard end wall 24, the central aperture 25 of which is just large enough to permit the pump impeller shaft 15 to extend therethrough with a smooth running fit. The outboard end of the cup-shaped housing 16 is open and the outer face of this end of the housing is adapted to form a bearing surface for an O ring carried by the end wall of the housing as hereinafter described.

As shown, the inside diameter of the housing 16 exceeds the diameter of the impeller shaft 15 by an amount sufficient to provide an annular clearance space 27 between the impeller shaft 15 and the wall 23 of the housing. This annular clearance space 27, sometimes referred to hereinafter as the seal chamber, is adapted to accommodate the internal mechanical seal of this invention which comprises, in part, a seal sleeve 28 formed of a metal suitable for the service to which the pump is to be put. Thus the seal sleeve 28 may be formed of brass when used for pumping water or may be formed of stainless steel or lead when used for pumping slurries or acids respectively.

The seal sleeve 28 is designed to fit on the impeller shaft 15 with a snug fit and to rotate therewith. To this end a set screw, key or the like, as indicated at 29, is provided on the outboard end of the sleeve 28 for positively locking the sleeve to the shaft against rotation relative thereto as well as against movement longitudinally thereof. At its inboard end, which, as shown, terminates short of the end wall 24 of the housing 16, the inner wall of the seal sleeve is provided with a pair of annular grooves 30—30 substantially semi-circular in cross section to accommodate a pair of rubber O rings 31—31 which serve to prevent liquid from entering between the seal sleeve 28 and the impeller shaft 15.

One of the purposes of the seal sleeve 28 is to prevent pressure from building up in the seal chamber 27, thereby breaking down the fluid tight joint between the sealing faces of the mechanical seal, and to this end the seal sleeve 28 is provided on its external surface with an integral spiral vane 32. The latter constitutes in effect an axial flow impeller which, upon rotation of the impeller shaft in its normal direction of rotation serves to set up a flow of fluid within the seal chamber countercurrent to the influx of fluid into the seal chamber from the impeller chamber, thereby minimizing the fluid pressure acting against the sealing faces of the mechanical seal.

The spiral vane 32 is preferably an integral part of the metal seal sleeve 28, but it wil be understood that the two members may be formed separately either of the same or different materials and held together by suitable fastening means.

Normally, that is to say for pumps intended to be used to pump substantially solid free liquids, the maximum diameter of the spiral vane 32 is such that its outer edge just clears the walls 23 of the seal chamber. On the other hand, if the pump is to be used for pumping liquids containing solids, the maximum diameter of the spiral vane is somewhat less than the diameter of the seal chamber so as to insure appreciable cleaarnce between the outer edge of the spiral vane and the walls 23 of the chamber.

About midway of its length, measured from its inboard end, the thickness of the seal sleeve 28 is reduced to provide an annular shoulder 33, the vertical face of which is directed towards the outboard end of the sleeve and is provided at its base with an annular groove 34 which is substantially rectangular in cross section. The grooved shoulder, so formed, provides, in effect, an annular rib 35 which is substantially rectangular in cross section and is adapted to engage in an annular groove 36 of similar cross section in the opposed face of a sealing ring 37.

The latter is preferably made of a resilient material such as soft rubber or neoprene and its internal diameter is such that the ring may be slid onto the outboard end of the sealing sleeve 28 and fit tightly thereon so as to be rotatable therewith, its annular groove 36 being engaged over the annular rib 35 of the sealing sleeve in which position the sealing ring makes a fluid tight seal with the sealing sleeve.

As shown especially well in Figure 3, the sealing ring 37 is roughly rectangular in cross section, its maximum outside diameter occuring at its outboard end at which point the diameter of the sealing ring may be substantially equal to or only slightly less than the diameter of the sealing chamber. In accordance with this construction the sealing ring affords a relatively wide outboard sealing face 38 for the purpose hereinafter described. In the embodiment shown, the forward or inboard end of the sealing ring 37 is of less diameter than its outboard end so as to insure clearance between this portion of the sealing ring and the walls of the sealing chamber.

The sealing ring 37 constitutes a second element of the internal mechanical seal, the third element of which is the end wall 39 for closing the open end of the seal housing 16. The end wall 39 comprises a metal plate which is adapted to be mounted with a free running fit on the outboard end of the sealing sleeve 28 in immediate juxtaposition to the sealing ring 37. The end wall 39 serves also as an adjusting means of the mechanical seal and as a retainer for auxiliary packing, and in this connection the outboard face of the end wall 39 is provided with a counterbore 40 to accommodate auxiliary packing 41 which is preferably of a type that does not require lubrication.

The overall diameter of the end wall 39 corresponds substantially to the overall diameter of the seal housing 16, and consequently the inboard face 42 of the end wall 39 spans and serves as a bearing surface for both the sealing face 38 of the sealing ring 37 and a rubber O ring 43 which is seated in an annular groove in the aforesaid bearing surface 42 of the end wall 39 substantially opposite the outboard end of the housing 16. The aforesaid rubber O ring 43 is thus adapted to provide a fluid tight seal between the open end of the seal housing and the end wall 39.

The latter is adapted also to be held against rotation by providing it with a plurality of integral outwardly extending ears 44, each of which has an aperture therein arranged to accommodate a corresponding stud bolt 22 of the pump frame 21 such that the ears of the end wall may be slid onto the stud bolts, thereby to hold the end wall from rotating with the sealing sleeve and sealing ring but to permit the end wall to be moved longitudinally relative thereto.

As mentioned above, the internal mechanical seal is characterized by adjusting means whereby the joint between the sealing ring 37 and the bearing surface 42 of the yoke member 39 may be maintained fluid tight at all times. The end wall 39 is one element of the adjusting means, the other elements of which comprise the adjusting nuts 45 which are threaded onto the respective studs 22 on the outboard sides of the aforesaid ears 44. By turning these nuts and the end wall 39, and in particular its bearing surface 42, may be moved to and from the sealing face 38 of the sealing ring to vary the pressure exerted on the rubber sealing ring for maintaining a fluid tight seal face 38 thereof and the bearing surface 42 of the end wall 39. It will be obvious too that when making adjustments of the end wall 39 relative to the sealing ring, an adjustment is also effected in the fluid tight point between the rubber O ring and the outboard end of the housing 16.

Turning again to the auxiliary packing 41—41 of the adjustable end wall 39, this packing, which constitutes elements of an external seal, is adapted to be held securely in the counterbore of the end wall to form a fluid tight seal with the outboard end of the sealing sleeve and the end wall 39. To this end a packing gland 46 is mounted on the outboard end of the sealing sleeve immediately adjacent the outboard face of the end wall, the packing gland 46 comprising a metal plate member supported relatively freely on the rotating sealing sleeve and held from rotating relative thereto by providing a plurality of apertures around its periphery for accommodating the outboard ends of the stud bolts 22. The inboard face of the packing gland 46 is provided with an integral annular flange 47, the diameter of which is slightly less than the diameter of the counterbore 40 of the end wall 39 such that the annular flange 47 may extend into the counterbore 40 to engage the packing 41.

Like the yoke member 39, the packing gland 46 is adjustable longitudinally of the sealing sleeve, thereby to vary the pressure applied on the packing 41, and to this end adjusting nuts 48 are provided on the stud bolts 22 opposite the outboard face of the packing gland so that by turning these nuts, the packing gland may be moved relative to the end wall 39 and its packing 41. In this connection it should be pointed out that the adjustment of the packing gland and replacement of the packing 41 may be made externally of the mechanical seal and without disassembling the internal mechanical seal.

In addition to the adjustments provided by the end wall 39 and the packing gland 46, the aforesaid sealing sleeve 28 may also be considered adjusting means for varying the pressure exerted by the sealing face 38 of the sealing ring 37 against the bearing surface 42 of the end wall 39. Thus, assuming the yoke member 39 to be fixed, then by loosening the set screw 29 of the sealing sleeve 28, the latter may be moved longitudinally of the impeller shaft 15 in an outboard direction so as to increase the pressure exerted by the sealing ring against the bearing surface 42 of the end wall 39, thereby taking up any wear between these mutually engaging sealing surfaces and insuring a fluid tight seal therebetween.

In preparing the mechanical seal of this invention for operation, the operator would first take cognizance of the type of liquid to be used in the pump and on this basis determine the type of sealing sleeve to be mounted on the impeller shaft 15. If the liquid is highly acid, then the impeller sleeve should comprise an acid resistant material such as lead, a special grade of stainless steel or the like. In a similar vein, if the liquid contains a solid, then a sealing sleeve should be chosen having a spiral vane dimensioned to provide ample clearance between the outer edge of the vane and the wall of the sealing housing to prevent the solids from jamming and scoring the walls of the housing.

The assembly of the parts of the mechanical seal is patent from the illustration but briefly embodies the steps of engaging the rubber or neoprene sealing ring 37 on the outboard end of a sealing sleeve 28 with the groove 36 of the sealing ring snapped over the annular rib 35 of the sleeve. This assembly is then slid on to the impeller shaft 15 and locked thereon by means of the set screw 29 with the outboard or sealing face 38 of the sealing ring substantially in the vertical plane of the outboard end of the housing 16. The end wall 39 of the housing is then slid on to the outboard end of the sealing sleeve with the apertured ears 44 of the end wall engaged on the stud bolts 22 of the pump frame. The adjusting nuts 45 are then threaded on to the outboard ends of the stud bolts and turned up to force the end wall 39 tightly against the sealing face 38 of the sealing ring at the end of the housing 16, thereby to form a fluid tight seal between the sealing face 38 of the sealing ring and the bearing surface 42 of the end wall as well as a fluid tight seal between the O ring 43 of the latter and the end of the housing 16. The auxiliary packing 41 is then forced into the counterbore of the end wall after which the packing gland 46 is assembled on the outboard end of the sealing sleeve and the stud bolts 22. The nuts 48 are then turned up to compress the packing 41 and form a fluid tight seal between the latter and the sealing sleeve.

From the foregoing description and drawings, it is evident that the mechanical seal of this invention embodies both an inside seal and an outside seal, the inside seal being one which, by the arrangement of the adjustable end wall and adjustable sealing sleeve, may be adjusted externally of the seal housing; and that the outside seal, i. e. the auxiliary packing of the end wall of the inside seal, is arranged exteriorally and independently of the adjusting means of the mechanical inside seal so that the adjustment of the latter will not be interfered with when adjusting or replacing the outside seal.

The mechanical seal of this invention, therefore, provides a satisfactory and efficient seal for the handling of corrosive liquids and highly abrasive suspensions, and because of the adjustable features of the seal and, in particular, the ease with which the adjustments may be made exteriorally of the seal, the latter substantially increases efficiency of operation and reduces shutdown for maintenance.

While this invention has been described and illustrated by the examples shown, it is not intended to be strictly limited thereto, and other variations and modifications may be employed within the scope of the following claims.

I claim:

1. A mechanical seal for a liquid pump comprising in combination: a pump shaft housing having a sealed end wall and a pump shaft extending through said housing and said end wall, adjustable sealing means for providing a fluid tight joint between said shaft and the sealed end wall of said housing, said adjustable sealing means comprising: a sleeve mounted on said shaft, an elastic sealing ring carried by said sleeve within said housing and arranged to be rotated with said sleeve, fastening means exteriorally of said housing arranged to releasably secure said sleeve to said shaft at selected positions longitudinally thereof and for rotation therewith, thereby to engage and hold said elastic sealing ring against the sealed end wall of said housing to form a fluid tight joint therewith, and an axial flow impeller comprising a helical vane on said sleeve constructed and arranged to counteract the flow of fluid pressure from the interior of the pump to the sealed end wall of said housing.

2. A mechanical seal for a liquid pump comprising in combination: a pump shaft housing having a sealed end wall and a pump shaft extending through said housing and said end wall, adjustable sealing means for providing a fluid tight joint between said shaft and the sealed end wall of said housing, said adjustable sealing means comprising: a sleeve mounted on said shaft, an elastic sealing ring carried by said sleeve within said housing and arranged to be rotated with said sleeve, fastening means exteriorally of said housing arranged to releasably secure said sleeve to said shaft at selected positions longitudinally thereof and for rotation therewith, thereby to engage and hold said sealing ring against the sealed end wall of said housing to form a fluid tight joint therewith, an axial flow impeller comprising a helical vane on said sleeve constructed and arranged to counteract the flow of fluid pressure from the interior of the pump to the sealed end wall of said housing, and auxiliary sealing means between the sealed end wall of said housing and said sleeve.

3. A mechanical seal for a liquid pump comprising in combination: a pump shaft housing having a sealed end wall and a pump shaft extending through said housing and said end wall, adjustable sealing means for providing a fluid tight joint between said shaft and the sealed end wall of said housing, said adjustable sealing means comprising: a sleeve mounted on said shaft, an elastic sealing ring carried by said sleeve within said housing and arranged to be rotated with said sleeve, fastening means exteriorally of said housing arranged to releasably secure said sleeve to said shaft at selected positions longitudinally thereof and for rotation therewith, thereby to engage and hold said sealing ring against the sealed end wall of said housing to form a fluid tight joint therewith, an axial flow impeller comprising a helical vane on said sleeve constructed and arranged to counteract the flow of fluid pressure from the interior of the pump to the sealed end wall of said housing, and auxiliary sealing means between the sealed end wall of said housing and said sleeve, said auxiliary sealing means comprising packing carried by said sealed end wall and a packing gland supported in juxtaposition to the sealed end wall and arranged to compress the packing therein to form a fluid tight joint between said sealed end wall and said sleeve.

4. In a mechanical seal for a shaft including a housing having a sealed end wall with the shaft extending through said housing and said sealed end wall; adjustable sealing means for providing a fluid tight joint between said shaft and the sealed end wall of said housing, said adjustable sealing means comprising: a sleeve mounted on said shaft, said sleeve having a radially extending annular shoulder within said housing and spaced from the end wall thereof, said shoulder being provided with an axially extending annular rib opposing said end wall; an elastic sealing ring having an inboard face and an outboard face, the inboard face of said sealing ring being provided with an annular groove, said axially extending rib of the shoulder being received in said groove whereby said elastic sealing ring is carried by the shoulder on the sleeve within said housing, and a plane surface on the outboard face of said sealing ring; and fastening means carried by said sleeve to secure said sleeve to said shaft for rotation therewith and to secure said sleeve at selective positions longitudinally thereof thereby to releasably engage and hold the plane surface of the outboard face of said sealing ring against the sealed end wall of said housing to form a fluid tight joint therewith.

(References on following page)

References Cited in the file of this patent

UNITED STATES PATENTS

| | | |
|---|---|---|
| 589,725 | Hodge et al. | Sept. 7, 1897 |
| 675,019 | Saxton | May 28, 1901 |
| 836,408 | Somes | Nov. 20, 1906 |
| 2,089,377 | Jehl | Aug. 10, 1937 |
| 2,185,876 | Wiessner | Jan. 2, 1940 |
| 2,306,417 | Weissner | Dec. 29, 1942 |
| 2,445,247 | Smith | July 13, 1948 |
| 2,492,402 | Smith | Dec. 27, 1949 |

OTHER REFERENCES

The Cameron Pump Shaft Seal, published by Ingersoll-Rand in Bulletin 7018, page 1. (Copy in Scientific Library.)